United States Patent
Hoshino et al.

(10) Patent No.: US 6,849,571 B2
(45) Date of Patent: Feb. 1, 2005

(54) CATALYST FOR SELECTIVELY OXIDIZING CARBON MONOXIDE

(75) Inventors: Maki Hoshino, Kawasaki (JP); Hiroaki Kaneko, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/232,823

(22) Filed: Sep. 3, 2002

(65) Prior Publication Data

US 2003/0059360 A1 Mar. 27, 2003

(30) Foreign Application Priority Data

Sep. 3, 2001 (JP) .......................................... 2001-265409
Aug. 9, 2002 (JP) .......................................... 2002-232481

(51) Int. Cl.[7] .......................... B01J 21/08; C01B 31/20
(52) U.S. Cl. ...................... 502/243; 502/242; 502/250; 502/261; 502/262; 502/302; 502/328; 502/330; 502/334; 423/224; 423/247
(58) Field of Search .............................. 502/242, 243, 502/250, 261, 262, 302, 328, 330, 334; 423/224, 247, 246

(56) References Cited

U.S. PATENT DOCUMENTS

| | | | |
|---|---|---|---|
| 4,238,317 A | * 12/1980 | Vasalos et al. | 208/120.05 |
| 4,675,308 A | * 6/1987 | Wan et al. | 502/304 |
| 4,849,398 A | * 7/1989 | Takada et al. | 502/303 |
| 5,756,057 A | 5/1998 | Txuchitani et al. | |
| 5,948,377 A | * 9/1999 | Sung | 423/213.5 |
| 5,948,723 A | * 9/1999 | Sung | 502/303 |
| 5,989,507 A | * 11/1999 | Sung et al. | 423/213.5 |
| 6,010,673 A | * 1/2000 | Kanazawa et al. | 423/213.5 |
| 6,294,140 B1 | * 9/2001 | Mussmann et al. | 423/213.5 |
| 6,350,423 B1 | * 2/2002 | Aoyama | 423/247 |
| 6,696,167 B2 | 2/2004 | Sean et al. | |
| 2002/0131914 A1 | * 9/2002 | Sung | 422/177 |
| 2003/0083194 A1 | * 5/2003 | Sung | 502/304 |

FOREIGN PATENT DOCUMENTS

| | | | |
|---|---|---|---|
| EP | 0 875 288 | 11/1998 | |
| JP | 9-30802 | 2/1997 | |
| JP | WO99/16706 | * 9/1998 | ............ C01B/3/58 |
| JP | 2001-252564 | 9/2001 | |
| WO | WO 02/26618 | 4/2002 | |

* cited by examiner

Primary Examiner—Steven Bos
Assistant Examiner—William G. Wright, Sr.
(74) Attorney, Agent, or Firm—McDermott Will & Emery LLP (57) ABSTRACT

A catalyst (5) for selectively oxidizing carbon monoxide, wherein a noble metal (3) and an active oxygen supply material (4) capable of oxidizing carbon monoxide are supported on a substrate (6). Favorable selective oxidation of carbon monoxide can be obtained by setting the distance between the noble metal (3) and the active oxygen supply material (4) such that the noble metal (3) is close enough to accept active oxygen from the active oxygen supply material (4), and preferably within 0.1 mm. This catalyst (5) for selectively oxidizing carbon monoxide is effective at removing carbon monoxide from a reformate gas whose main component is hydrogen and which is supplied to a fuel cell.

17 Claims, 2 Drawing Sheets

CATALYST FOR SELECTIVELY OXIDIZING CARBON MONOXIDE

FIELD OF THE INVENTION

This invention relates to a catalyst for selectively oxidizing carbon monoxide, with which carbon monoxide is selectively oxidized and removed from a gas whose main component is hydrogen ($H_2$) and which contains carbon monoxide (CO).

BACKGROUND OF THE INVENTION

Tokkai Hei 9-30802, published by the Japanese Patent Office in 1998, discloses a carbon monoxide selective oxidation catalyst containing platinum (Pt) and ruthenium (Ru).

In a fuel cell power plant that makes use of reformate gas of methanol, carbon monoxide must be removed from the reformate gas in the presence of methanol. The carbon monoxide selective oxidation catalyst pertaining to this prior art was developed in an effort to meet this need.

SUMMARY OF THE INVENTION

Prior art requires a large quantity of oxygen in order to remove carbon monoxide in the presence of methanol. When a large amount of oxygen is introduced into a reformate gas, however, the oxygen reacts with hydrogen and produces water, which can result in a decrease in the hydrogen concentration of the reformate gas.

It is therefore an object of this invention to remove carbon monoxide from reformate gas with very little oxygen in the presence of methanol.

It is a further object of this invention to provide a carbon monoxide selective oxidation catalyst that is also effective on a reformate gas of gasoline.

It is yet another object of this invention to provide a carbon monoxide selective oxidation catalyst that is highly efficient when used in a small quantity, and is particularly suited to fuel cell power plants mounted on vehicles.

In order to achieve the above objects, this invention provides a catalyst for selectively oxidizing carbon monoxide, comprising a substrate, a noble metal supported on the substrate, and a supply material supported on the substrate for supplying active oxygen to the noble metal. The distance between the supply material and the noble metal is set to cause the active oxygen to be transferred from the supply material to the noble metal, preferably within 0.1 millimeter.

This invention also provides a method for reducing the carbon monoxide concentration of a reformate gas using the catalyst for selectively oxidizing carbon monoxide. According to the reducing method, the carbon monoxide contained in a reformate gas is selectively oxidized into carbon dioxide by bringing a mixed gas of the reformate gas and oxygen into contact with the catalyst for selectively oxidizing carbon monoxide.

This invention also provides a method for manufacturing the catalyst for selectively oxidizing carbon monoxide. The manufacturing method comprises forming an impregnated substrate, in which a substrate is impregnated with a precursor of an active oxygen supply material and a precursor of a noble metal at a water content that is no more than the saturated water absorption of the substrate, drying the impregnated substrate, and subjecting the dried impregnated substrate to a reduction treatment in a reductive gas.

The details as well as other features and advantages of this invention are set forth in the remainder of the specification and are shown in the accompanying drawings.

DESCRIPTION OF THE PREFERRED EMBODIMENTS

Figure 1:
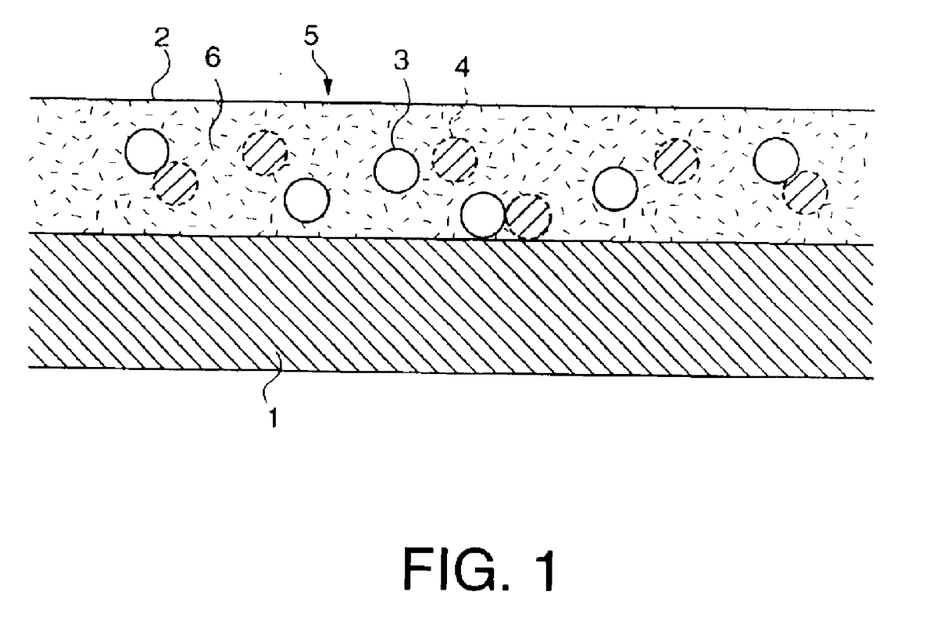
FIG. 1 is a schematic cross-sectional view of a carbon monoxide selective oxidation catalyst according to this invention.

Referring to FIG. 1 of the drawings, a carbon monoxide selective oxidation catalyst 5 pertaining to this invention is a catalyst produced by covering a metal support 1 with a catalyst layer 2 comprising a noble metal 3, an active oxygen supply material 4 capable of oxidizing carbon monoxide (CO), and a substrate 6 which supports the noble metal and active oxygen supply material 4.

Alumina, titania, silica, or zirconia, either alone or as a mixture of a plurality of types, is used for the substrate 6. Substrates made up of these materials securely support the noble metal 3 and the oxygen supply material 4, affording more stable performance of the carbon monoxide selective oxidation catalyst 5.

The noble metal 3 is disposed close enough to the active oxygen supply material 4 to accept active oxygen from this material. Preferably, the distance between the noble metal 3 and all or part of the active oxygen supply material 4 is set to 0.1 millimeter (mm) or less. This arrangement improves the ability of the noble metal to accept oxygen from the active oxygen supply material 4. As a result, better selective carbon monoxide oxidation performance is exhibited over a wide temperature range, including lower temperatures. Also, even in environments in which an unreformed fuel such as methanol or gasoline is present, carbon monoxide can be selectively oxidized and removed with a smaller amount of oxygen brought in. If the distance between the active oxygen supply material 4 and the noble metal 3 is zero, this means that the active oxygen supply material 4 is touching the noble metal 3.

The noble metal 3 can be platinum (Pt), ruthenium (Ru), rhodium (Rh), palladium (Pd), osmium (Os), or iridium (Ir). Preferably, the noble metal includes ruthenium and platinum in a mass ratio ranging from 1:0.2 to 1:5. This arrangement allows the ruthenium to interact with the platinum, and allows carbon monoxide selective oxidation activity to be exhibited with less oxygen brought in.

Let us now describe the interaction between ruthenium and platinum. If the catalyst noble metal consists solely of platinum, carbon monoxide will be strongly adsorbed to the catalyst at low temperatures, and the catalyst will end up in what is known as a carbon monoxide poisoned state, making it difficult for the carbon monoxide to react. On the other hand, if the catalyst noble metal consists solely of ruthenium, methanation of the carbon monoxide at high temperatures cannot be prevented. Using ruthenium and platinum together for the catalyst noble metal prevents the carbon monoxide reaction from proceeding at low temperatures, and prevents the methanation of the carbon monoxide at high temperatures.

The reason the ruthenium and platinum are used together in a range of 1:0.2 to 1:5 in the catalyst noble metal is as follows. If the mass ratio of ruthenium and platinum is under 1:0.2, numerous particles of just ruthenium which do not interact with platinum will be present in the catalyst, so no carbon monoxide selective oxidation activity due to interaction can be expected. On the other hand, if the mass ratio of ruthenium and platinum is over 1:5, numerous particles of just platinum which do not interact with ruthenium will be present in the catalyst, so once again no carbon monoxide selective oxidation activity due to interaction can be expected.

The active oxygen supply material 4 comprises at least one type of metal compound selected from among alkali metal compounds, alkaline earth metal compounds, and rare earth metal compounds, and is supported along with the noble metal 3 in the catalyst layer 2 by the substrate 6.

One or more different compounds of potassium, cesium, rubidium, sodium, and lithium can be used as the alkali metal compound. One or more different compounds of barium, calcium, magnesium, and strontium can be used as the alkaline earth metal compound. One or more different compounds of lanthanum, cerium, praseodymium, neodymium, samarium, and gadolinium can be used as the rare earth metal compound.

The metal compounds are supported in an amount such that the value calculated as the amount of metal will be between 0.1 and 20 mass percent with respect to the amount of the substrate 6. The lower limit of 0.1 mass percent is the lower limit at which the metal compounds will have an effect, while the upper limit of 20 mass percent is the upper limit at which the carbon monoxide selective oxidation reaction of the catalyst will not be inhibited. A preferred range is from 0.1 to 15 mass percent with respect to the amount of the substrate 6, calculated as the amount of metal.

When the carbon monoxide selective oxidation catalyst 5 is used to remove carbon monoxide from a reformate gas of methanol, it is preferable for the amount of supported metal compound to be from 0.5 to 15 mass percent with respect to the amount of the substrate 6, calculated as the amount of metal. When the carbon monoxide selective oxidation catalyst 5 is used to remove carbon monoxide from a reformate gas of gasoline, it is preferable for the amount of supported metal compound calculated as the amount of metal to be from 0.1 to 10 mass percent with respect to the amount of the substrate 6.

These metal compounds raise the oxygen acceptability of the catalyst 5. As a result, selective oxidation activity on carbon monoxide is exhibited from a lower temperature region than with a catalyst that does not support these compounds. Accordingly, just carbon monoxide can be efficiently removed from a reformate gas using a small amount of oxygen in an environment in which unreformed fuel such as methanol or gasoline is present.

The method for removing carbon monoxide from a reformate gas pertaining to this invention, using the above-mentioned carbon monoxide selective oxidation catalyst, will now be described.

The term "reformate gas" refers to a gas (hydrogen-rich gas) whose main component is hydrogen and which is obtained by the reformation of a fuel such as methanol or gasoline. The carbon monoxide removal method pertaining to this invention involves bringing this reformate gas along with an oxidant gas containing oxygen into contact with the carbon monoxide selective oxidation catalyst. The phrase "oxidant gas containing oxygen" means pure oxygen or air.

The temperature of the catalyst here is preferably between 60 and 200 degrees centigrade (° C.). A range of 80 to 160° C. is even better.

If the temperature of the catalyst goes over 200° C., a reverse shift reaction will tend to occur, producing carbon monoxide. Also, the carbon monoxide will react with the hydrogen ($H_2$) in the reformate gas and generate methane, which unfavorably lowers the hydrogen concentration. On the other hand, if the temperature of the catalyst is under 60° C., any water or unreformed fuel in the reformate gas will tend to condense. "Unreformed fuel" means the raw material of the reformate gas. In other words, unreformed fuel refers to methanol if we are discussing a reformate gas of methanol.

In the removal of carbon monoxide from a reformate gas, the unreformed fuel concentration in the reformate gas is kept at no more than 10 percent, and preferably no more than 5 percent, as a volumetric ratio. When unreformed fuel adsorbs to the surface of the carbon monoxide selective oxidation catalyst, it diminishes the carbon monoxide selective oxidation performance of the catalyst. It is therefore preferable for the unreformed fuel concentration in the reformate gas to be low.

The method for manufacturing the above-mentioned carbon monoxide selective oxidation catalyst pertaining to this invention will now be described.

The manufacturing method comprises a step of impregnating a substrate with a precursor of an active oxygen supply material and a precursor of a noble metal at a water content that is under the saturated water absorption of the substrate, a step of drying the impregnated substrate, and a step of subjecting the dried impregnated substrate to a reduction treatment in a reductive gas.

In the impregnation step, the precursor of an active oxygen supply material and the precursor of a noble metal may be made to impregnate the substrate together or separately. In the latter case, the substrate is impregnated with the precursor of a noble metal before the water content of the substrate reaches the saturated water absorption. In particular, impregnating the substrate with the precursor of a noble metal at a water content that is under the saturated water absorption makes it less likely that the ruthenium will separate, and promotes the formation of particles of platinum-ruthenium.

A platinum precursor is preferably in the form of a dinitrodiamine platinum aqueous solution or a chloroplatinate solution. A dinitrodiamine platinum aqueous solution is particularly favorable since there is no danger of chlorine remaining in the solution after it is supported. The amount of platinum precursor contained in the solution used for impregnation is preferably from 1 to 15 mass percent, calculated as platinum. A range of 5 to 10 mass percent is even better. If the content is less than one mass percent, such a large amount of solution will be needed for impregnation that it will be difficult to set the amount of solution under the saturated water absorption amount, but it is also undesirable to exceed 15 mass percent because it will be difficult for the platinum to be supported in a highly dispersed state.

Similarly, the ruthenium precursor is preferably used in the form of ruthenium nitrate, ruthenium acetate, or ruthenium chloride, for example, and ruthenium nitrate is particularly favorable because there is no danger of chlorine remaining in the solution after supporting. The amount of ruthenium precursor contained in the solution used for impregnation is preferably from 1 to 10 mass percent, and even more preferably 2 to 8 mass percent, calculated as ruthenium. A range of 5 to 10 mass percent is even better. If the content is less than one mass percent, a large amount of solution will be needed for impregnation, and it will therefore be difficult to set the amount of solution under the saturated water absorption amount. On the other hand, if the content is over 10 mass percent, it will be difficult for the ruthenium to be thoroughly dispersed in the catalyst.

The term "active oxygen supply material" refers to the above-mentioned alkali metal compounds, alkaline earth metal compounds, and rare earth metal compounds. The precursor of the active oxygen supply material is used in the form of a salt, such as a nitrate, sulfate, carbonate, or acetate.

Potassium, cesium, rubidium, sodium, and lithium are favorable as the metal of the alkali metal compound. Cesium nitrate, cesium carbonate, cesium acetate, and potassium acetate are favorable as precursors, and when cesium nitrate is used the carbon monoxide concentration can be reduced over a particularly wide range of temperatures.

Barium, calcium, magnesium, and strontium are favorable as the metal of the alkaline earth metal compound. Magnesium acetate, calcium nitrate, barium nitrate, strontium acetate, barium acetate, and magnesium nitrate are favorable as precursors.

Lanthanum, cerium, praseodymium, neodymium, samarium, and gadolinium are favorable as the metal of the rare earth metal compound. Lanthanum acetate, neodymium acetate, praseodymium acetate, gadolinium nitrate, and samarium acetate are favorable as precursors.

The precursor of the active oxygen supply material is suitably selected so as to have good affinity with the various usage forms of platinum or ruthenium. To give an example, cesium nitrate can be used favorably for the precursor of the active oxygen supply material when ruthenium nitrate is used. Using cesium nitrate or another such cesium-containing compound as a precursor for the active oxygen supply material allows a catalyst with high carbon monoxide selective oxidation performance to be manufactured.

The precursor content in the solution used for impregnation with the precursor of the active oxygen supply material is between 5 and 80 mass percent. A range of 20 to 80 mass percent is even better. If the precursor content (as metal mass) in the solution is less than 5 mass percent, the active oxygen supply material cannot be expected to have any effect. On the other hand, if the precursor content (as metal mass) in the solution goes over 80 mass percent, there is the danger that the dispersibility of the active oxygen supply material will decrease.

The substrate is a-alumina, b-alumina, g-alumina, titania, silica, or zirconia, which may be used singly or in combination. A single material should have a pore volume of from 0.1 to 0.8 milliliters per gram (mL/g), and preferably from 0.3 to 0.6 mL/g. If the pore volume is less than 0.1 mL/g, it is possible that the catalyst component cannot be supported in a sufficient concentration and the desired performance will not be obtained. On the other hand, there is the possibility that the substrate will not be strong enough if the pore volume is over 0.8 mL/g.

The specific surface area of the substrate should be between 50 and 400 square meters/gram ($m^2/g$). A range of 100 to 300 $m^2/g$ is even better. The dispersibility of the catalyst component will be inadequate if the specific surface area of the substrate is less than 50 $m^2/g$, but it will be difficult to maintain the specific surface area if this area is greater than 400 $m^2/g$.

Examples of substrates that satisfy the above conditions include active alumina KHA made by Sumitomo Chemical Co., Ltd., active alumina RN and Neobead MSC made by Mizusawa Industrial Chemicals, Ltd., and SBa made by Corning (US). Using an alumina substrate, which is a stable substance with a large surface area, allows more catalyst component to be supported.

"Saturated water absorption" refers to the amount of water that one gram of substrate can absorb at saturation. The saturated water absorption is a function of the pore volume of the substrate, and is an intrinsic value of a material. The saturated water absorption can be measured by measuring the pore volume by nitrogen adsorption process, for example.

The saturated water absorption is 0.53 mL/g in the case of the above-mentioned active alumina KHA made by Sumitomo Chemical Co., 0.50 mL/g with the active alumina RN made by Mizusawa Industrial Chemicals, 0.40 mL/g with the Neobead MSC made by Mizusawa Industrial Chemicals, and 0.45 mL/g with the SBa made by Corning.

Separation of the ruthenium component can be suppressed, and the specified amount of ruthenium can be supported on the substrate, by impregnating the substrate with a catalyst preparation solution under the saturated water absorption amount and at least one percent of the saturated water absorption amount of each substrate. Preferably, the substrate is impregnated with a catalyst preparation solution that is at least 10 percent and no more than 95 percent of the saturated water absorption amount of the substrate. If the catalyst preparation solution amount is less than one percent of the saturated water absorption amount of each substrate, it will be difficult to support the catalyst metal with good dispersibility.

Next, we will describe the drying of the substrate that has been impregnated with a precursor of an active oxygen supply material and a precursor of a noble metal.

The substrate drying temperature is between 40 and 150° C., with a range of 40 to 100° C. being preferred. Under 40° C. the drying may be inadequate, but if 150° C. is exceeded, there is the possibility that the high temperature will volatilize the ruthenium, so that the required amount of ruthenium is not supported. Keeping the substrate drying temperature between 40 and 100° C. keeps the dissociated oxygen originating in the ruthenium compound from reacting with the ruthenium and forming $RuO_4$ in the drying process following impregnation, and prevents the volatilization of the ruthenium.

The drying temperature should be from 0.5 to 30 hours, and a range of 2 to 20 hours is preferable. The drying may be inadequate if the drying time is shorter than 0.5 hour, but the ruthenium may volatilize if the drying time is longer than 30 hours.

There are no particular restrictions on the atmosphere in which the substrate is dried, but good results will be obtained in an atmosphere of air, nitrogen, helium, argon, or a mixture of these gases. Nor are there any particular restrictions on the drying method. Natural drying, evaporation to dryness, the use of a rotary evaporator, the use of a forced air dryer, and various other known drying techniques can be employed.

When the substrate is impregnated separately with the precursor of the active oxygen supply material and the precursor of the noble metal, the drying process is carried out for each impregnation. The drying process in this case may involve the same or different specifications.

The dried substrate is subjected to sizing or granulation as needed. Then size of the particles will vary with the size and shape of the catalyst in which the catalyst particles are packed, but should be such that the reductive gas can pass through quickly and without restriction, so that a reductive atmosphere can be maintained at all times. If the reductive gas becomes stagnant, without passing through quickly, and the reductive atmosphere cannot be maintained, not only will this lead to the oxidation of the ruthenium, but the reduction treatment may also be insufficient and the desired catalyst particles not obtained.

Granulation can be performed more efficiently if the granulation process is carried out prior to the drying process. One method of granulation is to apply pressure to crush the material, then pulverize and sift to adjust the size of the particles. Another method is to put a wet impregnated substrate in a granulator, and granulate it to the specified size by extrusion molding. In crushing the material under pressure, the crushing must be performed within a pressure range that will not destroy the pore structure of the substrate. When the material is granulated by extrusion molding, there is a method in which the dry substrate is put into the granulator after first being wetted with water, but a catalyst with the desired performance can be obtained more simply if the impregnated substrate is partially dried and introduced into the granulator while still wet, and then dried after being granulated.

We will now describe the process in which the dried substrate is treated as a reductive gas. Hydrogen gas, carbon monoxide gas, or ammonia gas can be used for the reductive gas, but hydrogen gas is generally used the most. Using hydrogen gas for the reductive gas allows the oxidation of ruthenium to be suppressed during the reduction treatment. The reduction treatment is preferably carried out over a period of 0.5 to 3 hours at a temperature of 400 to 650° C. The reduction treatment will be inadequate here if either the time or temperature is outside the above range. If the time or temperature is above this range, the particles of Pt-active oxygen supply material or Pt—Ru-active oxygen supply material may end up being sintered, and the desired catalyst particles may not be obtained.

The reductive gas may contain an inert gas as long as the reduction is not hindered. It is preferably, though, for the inert gas to account for a volume of less than 50 percent. If the inert gas concentration is over 50 percent, it will be difficult to maintain a reductive atmosphere at all times, and the reduction may be inadequate, preventing the desired catalyst particles from being obtained. Examples of the inert gas include nitrogen, helium, and argon.

Let us now discuss the space velocity during the reduction treatment.

The space velocity during the reduction treatment has been set relatively low in the past, but the reduction of the substrate was not always satisfactory. In this invention, the space velocity is set to a range of from 1000 to 500,000 hour$^{-1}$, and preferably from 2000 to 300,000 hour$^{-1}$. If the space velocity is less than 1000 hour$^{-1}$, the reduction may be inadequate, preventing the desired catalyst particles from being obtained. On the other hand, if the space velocity is over 500,000 hour$^{-1}$, an extremely large flux of reductive gas will be required for the reduction treatment, so the treatment apparatus will have to be larger. Keeping the space velocity between 2000 and 300,000 hour$^{-1}$ allows the substrate to undergo reduction treatment sufficiently, and allows the desired catalyst particles to be obtained.

The amount of the platinum supported on the substrate in the catalyst manufactured by the above process is from 0.1 mass percent to 10 mass percent, and preferably from 0.1 mass percent to 5 mass percent, as the amount of metal with respect to the amount of the substrate. If the supported amount is less than 0.1 mass percent, the resulting carbon monoxide selective oxidation performance will be inadequate. On the other hand, if 10 mass percent is exceeded, the dispersibility of platinum will decrease, and again the resulting carbon monoxide selective oxidation performance will be inadequate.

Also, the amount of the active oxygen supply material supported on the substrate is from 0.05 to 20 mass percent, and preferably from 0.1 to 15 mass percent, as the amount of metal with respect to the amount of the substrate. If the active oxygen supply material is supported on the substrate in an amount less than 0.05 mass percent, not enough active oxygen will be supplied. On the other hand, it is possible that catalyst performance will be compromised if the amount in which the active oxygen supply material is supported on the substrate is over 20 mass percent.

The method for manufacturing the carbon monoxide selective oxidation catalyst with the above process will now be described through examples manufactured experimentally by the inventors. The technical scope of this invention, however, is not limited to or by the following examples.

EXAMPLE 1 (Pt—Ru/Cs/Al$_2$O$_3$)

An aqueous solution of cesium nitrate was used as an impregnating solution for an alumina substrate, and was supported such that the final amount of cesium (Cs) supported was between 0.1 and 30 mass percent as the amount of metal with respect to the amount of the substrate. This product was then dried at 150° C. to obtain Cs/Al$_2$O$_3$ having various amounts of supported cesium (Cs).

Next, platinum (Pt) and ruthenium (Ru), which are carbon monoxide selective oxidation active components, were supported on the Cs/Al$_2$O$_3$. More specifically, the substrate was impregnated with a solution comprising a mixture of an aqueous solution (8.5 mass percent) of dinitrodiamine platinum and an aqueous solution (3.6 mass percent) of ruthenium nitrate, with the supported amounts of ruthenium (Ru) and platinum (Pt) adjusted to 2 and 3 mass percent respectively with respect to the amount of the substrate, that is, such that the ratio of the amounts of ruthenium and platinum would be 1:1.5. After being impregnated with the ruthenium and platinum, the substrate was dried at 150° C. for 4 hours.

Next, the dried product thus obtained was graded to 24–42 mesh/inch and packed into a specific reaction vessel, then treated for 1 hour at 500° C. in a hydrogen gas flow. This treatment reduced the platinum (Pt) and ruthenium (Ru), and gave a carbon monoxide selective oxidation catalyst (Pt—Ru/Cs/Al$_2$O$_3$) having various supported amounts of cesium (Cs).

In order to evaluate the obtained carbon monoxide selective oxidation catalyst, a mixed gas whose composition in a dry state comprised 50 mass percent hydrogen (H$_2$), 17 mass percent carbon dioxide (CO$_2$), one mass percent carbon monoxide (CO), and the remainder helium (He) was readied as a model gas 1, and this mixed gas was adjusted to an isooctane content of 0.1 percent and an absolute humidity of 30 percent.

The model gas 1 and an oxidation gas were mixed such that the oxygen excess amount Xco=1.5 with respect to the carbon monoxide selective oxidation catalyst of Example 1, and this mixed gas was supplied such that the space velocity=gas flux (cm$^3$/hour)/catalyst volume (cm$^3$)= approximately 10,000 hour$^{-1}$ on a dry gas basis. In this state, the carbon monoxide concentration was measured at the catalyst outlet at various reaction temperatures. The oxygen excess amount Xco is expressed by the following equation.

Xco=amount of oxygen introduced/(0.5.CO)

where, CO=amount of carbon monoxide in the model gas.

Figure 2:
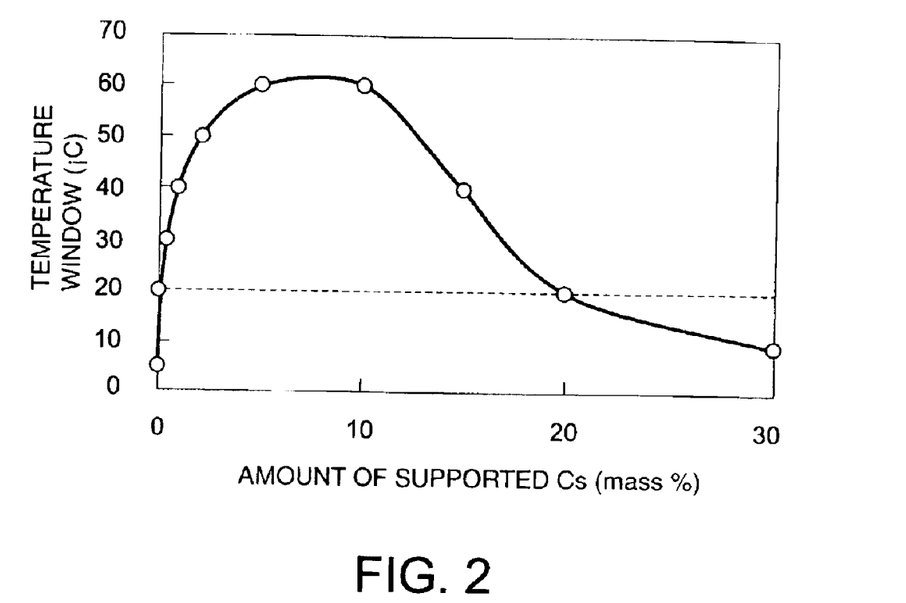
FIG. 2 is a diagram illustrating the relation between the amount of cesium (Cs) supported by the carbon monoxide selective oxidation catalyst in a first example of this invention (Example 1) and the atmosphere temperature at which favorable carbon monoxide removal capability is obtained.

Test results indicate that the carbon monoxide concentration can be lowered to under 40 parts per million (ppm) at a reaction temperature ranging from 60 to 140° C. according to the supported amount of cesium (Cs). A carbon monoxide concentration under 40 ppm is generally a permissible range for hydrogen-rich gas supplied to a fuel cell. Here, if we let the temperature window be the temperature range over which the carbon monoxide concentration can be lowered to the specified concentration or less, then the temperature window at which the carbon monoxide concentration can be lowered to 40 ppm or less will vary with the amount of supported cesium (Cs) as shown in FIG. 2. Experiment results reveal that an adequate temperature window was not obtained if the amount of supported cesium (Cs) was under 0.1 mass percent as the amount of metal with respect to the amount of the substrate, but as the amount of supported cesium (Cs) increased, the temperature window expanded, and maximum 60° C. temperature window was obtained. An adequate temperature window was not obtained when the amount of supported cesium (Cs) was over 20 mass percent, either.

EXAMPLE 2 (Pt—Ru/Cs/Al$_2$O$_3$)

The supported amounts of ruthenium and platinum in Example 1 were changed. The supported amount of ruthenium was changed to 4 mass percent and the supported amount of platinum to one mass percent, as the amount of metal with respect to the amount of the substrate. Therefore, the supported amount ratio between ruthenium and platinum was 1:0.25. The supported amount of cesium was changed to 2 mass percent as the amount of metal with respect to the amount of the substrate. The rest of the constitution was the same as in Example 1.

An evaluation test was conducted using model gas 1 just as in Example 1, and as a result the carbon monoxide concentration could be lowered to under 40 ppm over a reaction temperature range of 140 to 160° C.

EXAMPLE 3 (Pt—Ru/Cs/Al$_2$O$_3$)

The supported amount of ruthenium in Example 2 was changed to 3 mass percent and the supported amount of platinum to 2 mass percent as the amount of metal with respect to the amount of the substrate. Therefore, the supported amount ratio between ruthenium and platinum was 1:0.67. An evaluation test was conducted using model gas 1, and as a result the carbon monoxide concentration could be lowered to under 40 ppm over a reaction temperature range of 120 to 160° C.

EXAMPLE 4 (Pt—Ru/Cs/Al$_2$O$_3$)

The supported amount of ruthenium in Example 2 was changed to 2.5 mass percent and the supported amount of platinum to 2.5 mass percent as the amount of metal with respect to the amount of the substrate. Therefore, the supported amount ratio between ruthenium and platinum was 1:1. An evaluation test was conducted using model gas 1, and as a result the carbon monoxide concentration could be lowered to under 40 ppm over a reaction temperature range of 100 to 140° C.

EXAMPLE 5 (Pt—Ru/Cs/Al$_2$O$_3$)

The supported amount of ruthenium in Example 2 was changed to 2 mass percent and the supported amount of platinum to 3 mass percent as the amount of metal with respect to the amount of the substrate. Therefore, the supported amount ratio between ruthenium and platinum was 1:1.5. An evaluation test was conducted using model gas 1, and as a result the carbon monoxide concentration could be lowered to under 40 ppm over a reaction temperature range of 80 to 130° C.

EXAMPLE 6 (Pt—Ru/Cs/Al$_2$O$_3$)

The supported amount of ruthenium in Example 2 was changed to one mass percent and the supported amount of platinum to 4 mass percent as the amount of metal with respect to the amount of the substrate. Therefore, the supported amount ratio between ruthenium and platinum was 1:4. An evaluation test was conducted using model gas 1, and as a result the carbon monoxide concentration could be lowered to under 40 ppm over a reaction temperature range of 100 to 140° C.

COMPARATIVE SAMPLE 1 (Ru/Cs/Al$_2$O$_3$)

The supported amount of ruthenium in Example 2 was changed to 5 mass percent and the supported amount of platinum to 0 mass percent as the amount of metal with respect to the amount of the substrate. Therefore, the supported amount ratio between ruthenium and platinum was 1:0. An evaluation test was conducted using model gas 1, and as a result the carbon monoxide concentration could be lowered to under 40 ppm only when the reaction temperature was 180° C.

COMPARATIVE SAMPLE 2 (Pt—Ru/Cs/Al$_2$O$_3$)

The supported amount of ruthenium in Example 2 was changed to 4.5 mass percent and the supported amount of platinum to 0.5 mass percent as the amount of metal with respect to the amount of the substrate. Therefore, the supported amount ratio between ruthenium and platinum was 1:0.1. An evaluation was conducted using the above-mentioned model gas 1, and as a result the carbon monoxide concentration could be lowered to under 40 ppm only when the reaction temperature was 160° C.

COMPARATIVE SAMPLE 3 (Pt—Ru/Cs/Al$_2$O$_3$)

The supported amount of ruthenium in Example 2 was changed to 0.75 mass percent and the supported amount of platinum to 4.25 mass percent as the amount of metal with respect to the amount of the substrate. Therefore, the supported amount ratio between ruthenium and platinum was 1:5.6. An evaluation test was conducted using model gas 1, and as a result the carbon monoxide concentration could be lowered to under 40 ppm only when the reaction temperature was 130° C.

COMPARATIVE SAMPLE 4 (Pt—Ru/Cs/Al$_2$O$_3$)

The supported amount of ruthenium in Example 2 was changed to 0.5 mass percent and the supported amount of platinum to 4.5 mass percent as the amount of metal with respect to the amount of the substrate. Therefore, the supported amount ratio between ruthenium and platinum was 1:9. An evaluation test was conducted using model gas 1, and as a result the carbon monoxide concentration could be lowered to under 40 ppm only when the reaction temperature was 130° C.

COMPARATIVE SAMPLE 5 (Pt/Cs/Al$_2$O$_3$)

The supported amount of ruthenium in Example 2 was changed to 0 mass percent and the supported amount of platinum to 5 mass percent as the amount of metal with respect to the amount of the substrate. Therefore, the supported amount ratio between ruthenium and platinum was 0:1. An evaluation test was conducted using model gas 1, and as a result the carbon monoxide concentration could be lowered to under 40 ppm only when the reaction temperature was 140° C.

COMPARATIVE SAMPLE 6 (Pt—Ru/Al$_2$O$_3$)

The same alumina substrate as in Example 1 was impregnated with platinum and ruthenium in the same amounts as in Example 4, but without any cesium nitrate being supported. After this, drying, grading, packing, and reduction were carried out in the same manner as in Example 1 to obtain a carbon monoxide selective oxidation catalyst (Pt—Ru/Al$_2$O$_3$). The supported amount of ruthenium was 2.5 mass percent and the supported amount of platinum was 2.5 mass percent as the amount of metal with respect to the amount of the substrate, so the supported amount ratio between ruthenium and platinum was 1:1. An evaluation test was conducted using model gas 1, and as a result the carbon monoxide concentration could be lowered to under 40 ppm only when the reaction temperature was 120° C.

EXAMPLE 7 (Pt—Ru/K/Al$_2$O$_3$)

The same alumina substrate as in Example 1 was impregnated with an aqueous solution of potassium acetate such that the supported amount of potassium ended up being 3 mass percent as the amount of metal with respect to the amount of the substrate. After this, the substrate was dried at 150° C. to obtain K/Al$_2$O$_3$. This alumina substrate was then impregnated with ruthenium and platinum such that the supported amount of ruthenium was 2 mass percent and the supported amount of platinum was 3 mass percent. Therefore, the supported amount ratio between ruthenium and platinum was 1:1.5. After this, drying, grading, packing, and reduction were carried out in the same manner as in Example 1 to obtain a carbon monoxide selective oxidation catalyst (Pt—Ru/K/Al$_2$O$_3$). This catalyst was subjected to an evaluation test using model gas 1, and as a result the carbon monoxide concentration could be lowered to under 40 ppm over a reaction temperature range of 120 to 140° C.

EXAMPLE 8 (Pt—Ru/Ba/Al$_2$O$_3$)

The same alumina substrate as in Example 1 was impregnated with an aqueous solution of barium nitrate such that the supported amount of barium ended up being 3 mass percent as the amount of metal with respect to the amount of the substrate. After this, the substrate was dried at 150° C. to obtain Ba/Al$_2$O$_3$. This alumina substrate was then impregnated with ruthenium and platinum such that the supported amount of ruthenium was 2 mass percent and the supported amount of platinum was 3 mass percent. Therefore, the supported amount ratio between ruthenium and platinum was 1:1.5. After this, drying, grading, packing, and reduction were carried out in the same manner as in Example 1 to obtain a carbon monoxide selective oxidation catalyst (Pt—Ru/Ba/Al$_2$O$_3$). This catalyst was subjected to an evaluation test using model gas 1, and as a result the carbon monoxide concentration could be lowered to under 40 ppm over a reaction temperature range of 80 to 140° C.

EXAMPLE 9 (Pt—Ru/Ca/Al$_2$O$_3$)

The same alumina substrate as in Example 1 was impregnated with an aqueous solution of calcium nitrate such that the supported amount of calcium ended up being 3 mass percent as the amount of metal with respect to the amount of the substrate. After this, the substrate was dried at 150° C. to obtain Ca/Al$_2$O$_3$. This alumina substrate was then impregnated with ruthenium and platinum such that the supported amount of ruthenium was 2 mass percent and the supported amount of platinum was 2 mass percent. Therefore, the supported amount ratio between ruthenium and platinum was 1:1.5. After this, drying, grading, packing, and reduction were carried out in the same manner as in Example 1 to obtain a carbon monoxide selective oxidation catalyst (Pt—Ru/Ca/Al$_2$O$_3$). This catalyst was subjected to an evaluation test using model gas 1, and as a result the carbon monoxide concentration could be lowered to under 40 ppm over a reaction temperature range of 100 to 140° C.

EXAMPLE 10 (Pt—Ru/La/Al$_2$O$_3$)

The same alumina substrate as in Example 1 was impregnated with an aqueous solution of lanthanum acetate such that the supported amount of lanthanum ended up being 3 mass percent as the amount of metal with respect to the amount of the substrate. After this, the substrate was dried at 150° C. to obtain La/Al$_2$O$_3$. This alumina substrate was then impregnated with ruthenium and platinum such that the supported amount of ruthenium was 2 mass percent and the supported amount of platinum was 2 mass percent. Therefore, the supported amount ratio between ruthenium and platinum was 1:1.5. After this, drying, grading, packing, and reduction were carried out in the same manner as in Example 1 to obtain a carbon monoxide selective oxidation catalyst (Pt—Ru/La/Al$_2$O$_3$). This catalyst was subjected to an evaluation test using model gas 1, and as a result the carbon monoxide concentration could be lowered to under 40 ppm over a reaction temperature range of 80 to 120° C.

EXAMPLE 11 (Pt—Ru/Ce/Al$_2$O$_3$)

The same alumina substrate as in Example 1 was impregnated with an aqueous solution of cerium nitrate such that the supported amount of cerium ended up being 3 mass percent as the amount of metal with respect to the amount of the substrate. After this, the substrate was dried at 150° C. to obtain Ce/Al$_2$O$_3$. This alumina substrate was then impregnated with ruthenium and platinum such that the supported amount of ruthenium was 2 mass percent and the supported amount of platinum was 3 mass percent. Therefore, the supported amount ratio between ruthenium and platinum was 1:1.5. After this, drying, grading, packing, and reduction were carried out in the same manner as in Example 1 to obtain a carbon monoxide selective oxidation catalyst (Pt—Ru/Ce/Al$_2$O$_3$). This catalyst was subjected to an evaluation test using model gas 1, and as a result the carbon monoxide concentration could be lowered to under 40 ppm over a reaction temperature range of 80 to 120° C.

EXAMPLE 12 (Pt—Ru/Nd/Al$_2$O$_3$)

The same alumina substrate as in Example 1 was impregnated with an aqueous solution of neodymium acetate such that the supported amount of neodymium ended up being 3 mass percent as the amount of metal with respect to the amount of the substrate. After this, the substrate was dried at 150° C. to obtain $Nd/Al_2O_3$. This alumina substrate was then impregnated with ruthenium and platinum such that the supported amount of ruthenium was 2 mass percent and the supported amount of platinum was 3 mass percent. Therefore, the supported amount ratio between ruthenium and platinum was 1:1.5. After this, drying, grading, packing, and reduction were carried out in the same manner as in Example 1 to obtain a carbon monoxide selective oxidation catalyst (Pt—Ru/Nd/$Al_2O_3$). This catalyst was subjected to an evaluation test using model gas 1, and as a result the carbon monoxide concentration could be lowered to under 40 ppm over a reaction temperature range of 100 to 120° C.

EXAMPLE 13 (Pt—Ru/Pr/$Al_2O_3$)

The same alumina substrate as in Example 1 was impregnated with an aqueous solution of praseodymium acetate such that the supported amount of praseodymium ended up being 3 mass percent as the amount of metal with respect to the amount of the substrate. After this, the substrate was dried at 150° C. to obtain $Pr/Al_2O_3$. This alumina substrate was then impregnated with ruthenium and platinum such that the supported amount of ruthenium was 2 mass percent and the supported amount of platinum was 2 mass percent. Therefore, the supported amount ratio between ruthenium and platinum was 1:1.5. After this, drying, grading, packing, and reduction were carried out in the same manner as in Example 1 to obtain a carbon monoxide selective oxidation catalyst (Pt—Ru/Pr/$Al_2O_3$). This catalyst was subjected to an evaluation test using model gas 1, and as a result the carbon monoxide concentration could be lowered to under 40 ppm over a reaction temperature range of 100 to 140° C.

EXAMPLE 14 (Pt—Ru/Cs/$SiO_2$)

A silica substrate was impregnated with an aqueous solution of cesium nitrate such that the supported amount of cesium was 3 mass percent as the amount of metal with respect to the amount of the substrate. The resultant product was dried at 150° C. to obtain $Cs/SiO_2$. This silica substrate was then impregnated with ruthenium and platinum by the same method as in the above examples such that the supported amount of ruthenium was 2.5 mass percent and the supported amount of platinum was 2.5 mass percent. Therefore, the supported amount ratio between ruthenium and platinum was 1:1. After this, drying, grading, packing, and reduction were carried out in the same manner as in Example 1 to obtain a carbon monoxide selective oxidation catalyst (Pt—Ru/Cs/$SiO_2$). This catalyst was subjected to an evaluation test using model gas 1, and as a result the carbon monoxide concentration could be lowered to under 40 ppm over a reaction temperature range of 100 to 140° C.

COMPARATIVE SAMPLE 7 (Pt—Ru/$SiO_2$)

The same alumina substrate as in Example 14 was impregnated with platinum and ruthenium in the same amounts as in Example 14, but without any cesium nitrate being supported. After this, drying, grading, packing, and reduction were carried out in the same manner as in Example 1 to obtain a carbon monoxide selective oxidation catalyst (Pt—Ru/$SiO_2$). This catalyst was subjected to an evaluation test using model gas 1, and as a result the carbon monoxide concentration could be lowered sufficiently only when the reaction temperature was 120° C.

EXAMPLE 15 (Pt—Ru/Cs/$TiO_2$)

A titania substrate was impregnated with an aqueous solution of cesium nitrate such that the supported amount of cesium was 3 mass percent as the amount of metal with respect to the amount of the substrate. This product was dried at 150° C. to obtain $Cs/TiO_2$. This titania substrate was then impregnated with ruthenium and platinum in the same amounts as in Example 14. After this, drying, grading, packing, and reduction were carried out in the same manner as in Example 14 to obtain a carbon monoxide selective oxidation catalyst (Pt—Ru/Cs/$TiO_2$). This catalyst was subjected to an evaluation test using model gas 1, and as a result the carbon monoxide concentration could be lowered to under 40 ppm over a reaction temperature range of 100 to 140° C.

EXAMPLE 16 (Pt—Ru/Cs/$ZrO_2$)

A zirconia substrate was impregnated with an aqueous solution of cesium nitrate such that the supported amount of cesium was 3 mass percent as the amount of metal with respect to the amount of the substrate. This product was dried at 150° C. to obtain $Cs/ZrO_2$. This zirconia substrate was then impregnated with ruthenium and platinum in the same amounts as in Example 14. After this, drying, grading, packing, and reduction were carried out in the same manner as in Example 14 to obtain a carbon monoxide selective oxidation catalyst (Pt—Ru/Cs/$ZrO_2$). This catalyst was subjected to an evaluation test using model gas 1, and as a result the carbon monoxide concentration could be lowered to under 40 ppm over a reaction temperature range of 120 to 160° C.

EXAMPLE 17 (Pt—Ru/Cs/$SiO_2$—$Al_2O_3$)

A silica-alumina substrate was impregnated with an aqueous solution of cesium nitrate such that the supported amount of cesium was 3 mass percent as the amount of metal with respect to the amount of the substrate. This product was dried at 150° C. to obtain $Cs/SiO_2$—$Al_2O_3$. This silica-alumina substrate was then impregnated with ruthenium and platinum in the same amounts as in Example 14. After this, drying, grading, packing, and reduction were carried out in the same manner as in Example 14 to obtain a carbon monoxide selective oxidation catalyst (Pt—Ru/Cs/$SiO_2$—$Al_2O_3$). This catalyst was subjected to an evaluation test using model gas 1, and as a result the carbon monoxide concentration could be lowered to under 40 ppm over a reaction temperature range of 140 to 160° C.

EXAMPLE 18 (Pt—Ru/Ca/$Al_2O_3$)

For the catalyst in Example 9, the composition of the model gas and the supported amount of calcium were changed, and the carbon monoxide concentration decreasing performance of the resulting Pt—Ru/Ca/$Al_2O_3$ catalyst was evaluated.

Specifically, an alumina substrate was impregnated with an aqueous solution of calcium nitrate such that the supported amount of calcium ended up being one mass percent as the amount of metal with respect to the amount of the substrate. After this, the substrate was dried at 150° C. to obtain $Ca/Al_2O_3$. This alumina substrate was then impregnated with ruthenium and platinum in the same amounts as in Example 9. After this, drying, grading, packing, and reduction were carried out in the same manner as in Example 9 to obtain a carbon monoxide selective oxidation catalyst (Pt—Ru/Ca/$Al_2O_3$).

The model gas was constituted as follows. A mixed gas whose composition in a dry state comprised 50 percent hydrogen ($H_2$) 17 percent carbon dioxide ($CO_2$), one percent carbon monoxide (CO), and the remainder helium (He) was prepared such that its absolute humidity was 30 percent. This model gas will be referred to as model gas 2 below.

The model gas 2 and an oxidation gas were mixed such that the oxygen excess amount Xco=1.5, and this mixed gas was supplied such that the space velocity was approximately 10,000 hour$^{-1}$ on a dry gas basis, and the carbon monoxide concentration was measured at the catalyst outlet at various reaction temperatures. As a result, the carbon monoxide concentration could be lowered to under 40 ppm over a reaction temperature range of 80 to 120° C.

EXAMPLE 19 (Pt—Ru/Cs/Al$_2$O$_3$)

For the catalyst in Example 5, the composition of the model gas and the supported amount of cesium were changed, and the carbon monoxide concentration decreasing performance of the resulting Pt—Ru/Cs/Al$_2$O$_3$ catalyst was evaluated.

Specifically, an alumina substrate was impregnated with an aqueous solution of cesium nitrate such that the supported amount of cesium ended up being one mass percent as the amount of metal with respect to the amount of the substrate. After this, the substrate was dried at 150° C. to obtain Cs/Al$_2$O$_3$. This alumina substrate was then impregnated with ruthenium and platinum in the same amounts as in Example 5. After this, drying, grading, packing, and reduction were carried out in the same manner as in Example 5 to obtain a carbon monoxide selective oxidation catalyst (Pt—Ru/Cs/Al$_2$O$_3$). An evaluation test was conducted using the same model gas 2 as in Example 18, and as a result the carbon monoxide concentration could be lowered to under 40 ppm over a reaction temperature range of 100 to 140° C.

EXAMPLE 20 (Pt—Ru/Pr/Al$_2$O$_3$)

For the catalyst in Example 13, the composition of the model gas and the supported amount of praseodymium were changed, and the carbon monoxide concentration decreasing performance of the resulting Pt—Ru/Pr/Al$_2$O$_3$ catalyst was evaluated.

Specifically, an alumina substrate was impregnated with an aqueous solution of praseodymium acetate such that the supported amount of praseodymium ended up being one mass percent as the amount of metal with respect to the amount of the substrate. After this, the substrate was dried at 150° C. to obtain Pr/Al$_2$O$_3$. This alumina substrate was then impregnated with ruthenium and platinum in the same amounts as in Example 13. After this, drying, grading, packing, and reduction were carried out in the same manner as in Example 13 to obtain a carbon monoxide selective oxidation catalyst (Pt—Ru/Pr/Al$_2$O$_3$). An evaluation test was conducted using the same model gas 2 as in Example 18, and as a result the carbon monoxide concentration could be lowered to under 40 ppm over a reaction temperature range of 100 to 140° C.

EXAMPLE 21 (Pt—Ru/Ca/Al$_2$O$_3$)

For the catalyst in Example 18, the composition of the model gas and the supported amounts of ruthenium and platinum were changed, and the carbon monoxide concentration decreasing performance of the resulting Pt—Ru/Ca/Al$_2$O$_3$ catalyst was evaluated.

Specifically, Ca/Al$_2$O$_3$ was obtained by the method in Example 18, after which this alumina substrate was impregnated with ruthenium and platinum such that the supported amount of ruthenium was 2.5 mass percent and the supported amount of platinum was 2.5 mass percent. Therefore, the supported amount ratio between ruthenium and platinum was 1:1. After this, drying, grading, packing, and reduction were carried out in the same manner as in Example 18 to obtain a carbon monoxide selective oxidation catalyst (Pt—Ru/Ca/Al$_2$O$_3$)

The model gas was constituted as follows. A mixed gas whose composition in a dry state comprised 50 percent hydrogen (H$_2$), 17 percent carbon dioxide (CO$_2$) one percent carbon monoxide (CO), and the remainder helium (He) was bubbled into a methanol aqueous solution, and adjusted such that its absolute humidity was 10 percent and the methanol [content] was 0.5 percent. This model gas will be referred to as model gas 3 below.

The model gas 3 and an oxidation gas were mixed such that the oxygen excess amount Xco=1.5, and this mixed gas was supplied to the catalyst such that the space velocity was approximately 10,000 hour$^{-1}$ on a dry gas basis, and the carbon monoxide concentration was measured at the catalyst outlet at various reaction temperatures. As a result, the carbon monoxide concentration could be lowered to under 40 ppm over a reaction temperature range of 100 to 140° C.

EXAMPLE 22 (Pt—Ru/Cs/Al$_2$O$_3$)

Composition of the model gas and the supported amounts of ruthenium and platinum were changed from those of Example 19, and the carbon monoxide concentration decreasing performance of the resulting Pt—Ru/Cs/Al$_2$O$_3$ catalyst was evaluated.

Specifically, Cs/Al$_2$O$_3$ was obtained by the same method as in Example 19, after which this alumina substrate was impregnated with ruthenium and platinum such that the supported amount of ruthenium was 2.5 mass percent and the supported amount of platinum was 2.5 mass percent. Therefore, the supported amount ratio between ruthenium and platinum was 1:1. After this, drying, grading, packing, and reduction were carried out in the same manner as in Example 19 to obtain a carbon monoxide selective oxidation catalyst (Pt—Ru/Cs/Al$_2$O$_3$).

This catalyst was subjected to an evaluation test using model gas 3 in the same manner as Example 21, and as a result the carbon monoxide concentration could be lowered to under 40 ppm over a reaction temperature range of 120 to 140° C.

EXAMPLE 23 (Pt—Ru/Pr/Al$_2$O$_3$)

Composition of the model gas and the supported amounts of ruthenium and platinum were changed from those of Example 20, and the carbon monoxide concentration decreasing performance of the resulting Pt—Ru/Pr/Al$_2$O$_3$ catalyst was evaluated.

Specifically, Pr/Al$_2$O$_3$ was obtained by the same method as in Example 20, after which this alumina substrate was impregnated with ruthenium and platinum such that the supported amount of ruthenium was 2.5 mass percent and the supported amount of platinum was 2.5 mass percent. Therefore, the supported amount ratio between ruthenium and platinum was 1:1. After this, drying, grading, packing, and reduction were carried out in the same manner as in Example 20 to obtain a carbon monoxide selective oxidation catalyst (Pt—Ru/Pr/Al$_2$O$_3$).

This catalyst was subjected to an evaluation test using model gas 3 in the same manner as Example 21, and as a result the carbon monoxide concentration could be lowered to under 40 ppm over a reaction temperature range of 120 to 140° C.

COMPARATIVE SAMPLE 8 (Pt—Ru/Cs/Al$_2$O$_3$)

The supported amount of cesium in Comparative Sample 2 was changed to 0.05 mass percent, and the carbon monoxide concentration decreasing performance of the resulting Pt—Ru/Cs/Al$_2$O$_3$ catalyst was evaluated. This catalyst was subjected to an evaluation test using model gas 1, and as a result the carbon monoxide concentration could be lowered to under 40 ppm only when the carbon monoxide concentration was 180° C.

COMPARATIVE SAMPLE 9 (Pt—Ru/Cs/Al$_2$O$_3$)

The supported amount of cesium in Comparative Sample 4 was changed to 25 mass percent, and the carbon monoxide concentration decreasing performance of the resulting Pt—Ru/Cs/Al$_2$O$_3$ catalyst was evaluated. This catalyst was subjected to an evaluation test using model gas 1, and as a result the carbon monoxide concentration could be lowered to under 40 ppm only when the carbon monoxide concentration was 140° C.

The test results for the above Examples 1 to 23 and Comparative Samples 1 to 9 are compiled in Table 1.

EXAMPLE 24 (Pt—Ru—Cs/Al$_2$O$_3$)

An impregnation solution was prepared by mixing 35.5 milliliters (mL) of an 8.5 mass percent dinitrodiamine platinum aqueous solution, 55.6 mL of a 3.6 mass percent ruthenium nitrate aqueous solution, and 14.7 grams (g) of cesium nitrate. 40 mL of this impregnation solution was used to impregnate 90 g of alumina substrate, SBa made by Corning, for 0.5 hour. The saturated water absorption of SBa is 0.45 mL/g. After this, the substrate was dried for 20 hours at a temperature of 90° C. The dried alumina substrate was granulated and packed into a specific vessel, then subjected to a reduction treatment for one hour at a temperature of 500° C., at a space velocity of 2000 hours$^{-1}$, and in a hydrogen gas flow, which yielded a Pt—Ru—Cs/Al$_2$O$_3$ catalyst.

A model gas constituted as follows was used to conduct an evaluation test of the carbon monoxide concentration decreasing performance of this catalyst. Specifically, a mixed gas whose composition in a dry state comprised 50 percent hydrogen (H$_2$), 17 percent carbon dioxide (CO$_2$), one percent carbon monoxide (CO), 1.5 percent oxygen (O$_2$) and the remainder helium (He) was bubbled into water, and adjusted such that its absolute humidity was 20 percent. This model gas will be referred to as model gas 4 below.

Figure 3:
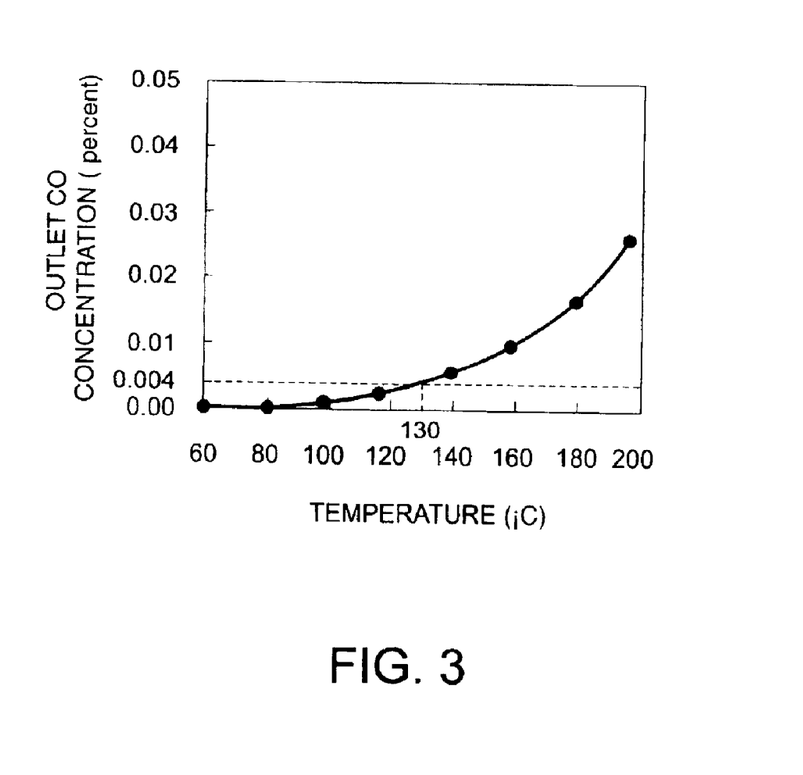
FIG. 3 is a diagram illustrating the relation between the reaction temperature of the carbon monoxide selective oxidation catalyst pertaining to a twenty-fourth example of this invention (Example 24) and the carbon monoxide concentration at the catalyst outlet.

The model gas 4 was supplied to the catalyst such that the space velocity was approximately 30,000 hours$^{-1}$ on a dry gas basis, and the carbon monoxide concentration was measured at the outlet at various reaction temperatures. As a result, as shown in FIG. 3, the carbon monoxide concentration could be lowered to under 40 ppm over a reaction temperature range of 60 to 130° C. Specifically, it was confirmed that the catalyst obtained by this manufacturing method efficiently performs the selective oxidation of carbon monoxide from a temperature as low as 60° C.

COMPARATIVE SAMPLE 10 (Pt—Ru—Cs/Al$_2$O$_3$)

A comparative impregnation solution was prepared by adding 20 mL of ion exchange water to 40 mL of a solution prepared in the same manner as in Example 24. This impregnation solution was used to impregnate 90 g of an alumina substrate SBa, and the substrate was dried for 20 hours at 90° C. As mentioned above, the saturated water absorption of SBa is 0.45 mL/g, and the reason for adding the 20 mL of ion exchange water to 40 mL of solution was so that the amount of impregnation solution would satisfy the saturated water absorption of the SBa alumina substrate.

Just as in Example 24, the dried alumina substrate was granulated and packed into a specific vessel, then subjected to a reduction treatment for one hour at a temperature of 500° C., at a space velocity of 2000 hour$^{-1}$, and in a hydrogen gas flow, which yielded a Pt—Ru—Cs/Al$_2$O$_3$ catalyst.

This catalyst was subjected to the same test as in Example 24. As a result, the carbon monoxide concentration could not be lowered to under 40 ppm.

EXAMPLE 25 (Pt—Ru/Cs/Al$_2$O$_3$)

In this example, instead of impregnating an alumina substrate with a mixed solution or platinum, ruthenium, and cesium as in Example 24, the substrate was first impregnated with an impregnation solution containing cesium, then impregnated with an impregnation solution containing platinum and ruthenium, which gave a carbon monoxide selective oxidation catalyst (Pt—Ru/Cs/Al$_2$O$_3$). This manufacturing method will be described in detail below.

First, 100 g of the same SBa alumina substrate as in Example 24 was impregnated for 0.5 hour with 30 mL of a 50 mass percent cesium nitrate aqueous solution, after which the substrate was dried for 20 hours at a temperature of 90° C. to obtain a Cs/Al$_2$O$_3$ powder. Next, 35.5 mL of an 8.5 mass percent dinitrodiamine platinum aqueous solution and 55.6 mL of a 3.6 mass percent ruthenium nitrate aqueous solution were mixed to prepare an impregnation solution. 40 mL of this impregnation solution was used to impregnate 100 g of the Cs/Al$_2$O$_3$ powder, and this product was dried for 20 hours at a temperature of 90° C. The dried alumina substrate was granulated and packed into a specific vessel, then subjected to a reduction treatment for one hour at a temperature of 500° C., at a space velocity of 2000 hours$^{-1}$, and in a hydrogen gas flow, which yielded a Pt—Ru/Cs/Al$_2$O$_3$ catalyst.

This catalyst was subjected to the same test as in Example 24. As a result, the carbon monoxide concentration could be lowered to under 40 ppm over a reaction temperature range of 80 to 140° C.

EXAMPLE 26 (Cs/Pt—Ru/Al$_2$O$_3$)

In Example 25, the process in which the alumina substrate was impregnated with an impregnation solution containing platinum and ruthenium and the process in which the alumina substrate was impregnated with an impregnation solution containing cesium were carried out in the opposite order, which gave a carbon monoxide selective oxidation catalyst (Cs/Pt—Ru/Al$_2$O$_3$).

More specifically, first, 35.5 mL of an 8.5 mass percent dinitrodiamine platinum aqueous solution and 55.6 mL of a 3.6 mass percent ruthenium nitrate aqueous solution were mixed to prepare an impregnation solution. 40 mL of this impregnation solution was used to impregnate 90 g of the same SBa alumina substrate as in Example 24, and this product was dried for 20 hours at a temperature of 90° C., which gave a Pt—Ru/Al$_2$O$_3$ powder.

Next, the Pt—Ru/Al$_2$O$_3$ powder was impregnated with a 50 mass percent cesium nitrate aqueous solution and dried for 20 hours at a temperature of 90° C. The dried powder was granulated and packed into a specific vessel, then subjected to a reduction treatment for one hour at a temperature of 500° C., at a space velocity of 2000 hour$^{-1}$, and in a hydrogen gas flow, which yielded a Cs/Pt—Ru/Al$_2$O$_3$ catalyst.

This catalyst was subjected to the same test as in Example 24. As a result, the carbon monoxide concentration could be lowered to under 40 ppm over a reaction temperature range of 100 to 140° C.

EXAMPLE 27 (Pt—Ru—Cs/Al$_2$O$_3$)

In Example 24, the drying of the substrate was changed to 20 hours at a temperature of 150° C., which gave a carbon monoxide selective oxidation catalyst (Pt—RuCs/Al$_2$O$_3$). The rest of the manufacturing process was the same as in Example 24.

This catalyst was subjected to the same test as in Example 24. As a result, the carbon monoxide concentration could be lowered to under 40 ppm over a reaction temperature range of 80 to 140° C.

EXAMPLE 28 (Pt—Ru—Cs/Al$_2$O$_3$)

In Example 24, the drying of the substrate was changed to 20 hours at a temperature of 30° C., which gave a carbon monoxide selective oxidation catalyst (Pt—Ru—Cs/Al$_2$O$_3$). The rest of the manufacturing process was the same as in Example 24.

This catalyst was subjected to the same test as in Example 24. As a result, the carbon monoxide concentration could be lowered to under 40 ppm over a reaction temperature range of 120 to 140° C.

COMPARATIVE SAMPLE 11 (Pt—Ru—Cs/A$_2$O$_3$)

In Example 24, the atmosphere in which the reduction treatment was conducted was changed to air, and the reduction treatment was conducted for one hour at a temperature of 500° C. and a space velocity of 2000 hour$^{-1}$, which gave a carbon monoxide selective oxidation catalyst (Pt—Ru—Cs/Al$_2$O$_3$). The rest of the manufacturing process was the same as in Example 24.

This catalyst was subjected to the same test as in Example 24. As a result, the carbon monoxide concentration could not be lowered to under 40 ppm.

COMPARATIVE SAMPLE 12 (Pt—Ru—Cs/Al$_2$O$_3$)

In Example 24, the atmosphere in which the reduction treatment was conducted was changed to nitrogen, and the reduction treatment was conducted for one hour at a temperature of 500° C. and a space velocity of 2000 hour$^{-1}$, which gave a carbon monoxide selective oxidation catalyst (Pt—Ru—Cs/Al$_2$O$_3$). The rest of the manufacturing process was the same as in Example 24.

This catalyst was subjected to the same test as in Example 24. As a result, the carbon monoxide concentration could not be lowered to under 40 ppm.

EXAMPLE 29 (Pt—Ru—Cs/Al$_2$O$_3$)

In Example 24, the space velocity during the reduction treatment was changed to 1000 hour$^{-1}$, which gave a carbon monoxide selective oxidation catalyst (Pt—Ru—Cs/Al$_2$O$_3$). The rest of the manufacturing process was the same as in Example 24.

This catalyst was subjected to the same test as in Example 24. As a result, the carbon monoxide concentration could be lowered to under 40 ppm over a reaction temperature range of 120 to 140° C.

EXAMPLE 30 (Pt—Ru—Cs/Al$_2$O$_3$)

In Example 24, the space velocity during the reduction treatment was changed to 5000 hour$^{-1}$, which gave a carbon monoxide selective oxidation catalyst (Pt—Ru—Cs/Al$_2$O$_3$). The rest of the manufacturing process was the same as in Example 24.

This catalyst was subjected to the same test as in Example 24. As a result, the carbon monoxide concentration could be lowered to under 40 ppm over a reaction temperature range of 60 to 130° C.

EXAMPLE 31 (Pt—Ru—Cs/Al$_2$O$_3$)

Instead of the 14.7 g of cesium nitrate used in Example 24, an impregnation solution was prepared using 14.5 g of cesium carbonate. The rest of the manufacturing process was the same as in Example 24. The carbon monoxide selective oxidation catalyst (Pt—Ru—Cs/Al$_2$O$_3$) thus obtained was subjected to the same test as in Example 24. As a result, the carbon monoxide concentration could be lowered to under 40 ppm over a reaction temperature range of 100 to 140° C.

EXAMPLE 32 (Pt—Ru—Cs/Al$_2$O$_3$)

Instead of the 14.7 g of cesium nitrate used in Example 24, a carbon monoxide selective oxidation catalyst (Pt—Ru—Cs/Al$_2$O$_3$) was obtained using 14.4 g of cesium acetate.

The catalyst thus obtained was subjected to the same test as in Example 24. As a result, the carbon monoxide concentration could be lowered to under 40 ppm over a reaction temperature range of 80 to 140° C.

EXAMPLE 33 (Pt—Ru—K/Al$_2$O$_3$)

Instead of the 14.7 g of cesium nitrate used in Example 24, a carbon monoxide selective oxidation catalyst (Pt—Ru—K/Al$_2$O$_3$) was obtained using 25.1 g of potassium acetate.

The catalyst thus obtained was subjected to the same test as in Example 24. As a result, the carbon monoxide concentration could be lowered to under 40 ppm over a reaction temperature range of 100 to 140° C.

EXAMPLE 34 (Pt—Ru—Mg/Al$_2$O$_3$)

Instead of the 14.7 g of cesium nitrate used in Example 24, a carbon monoxide selective oxidation catalyst (Pt—Ru—Mg/Al$_2$O$_3$) was obtained using 58.5 g of magnesium acetate.

The catalyst thus obtained was subjected to the same test as in Example 24. As a result, the carbon monoxide concentration could be lowered to under 40 ppm over a reaction temperature range of 100 to 140° C.

The test results for the above Examples 24 to 34 and Comparative Samples 10 to 12 are compiled in Table 2.

EXAMPLE 35 (PHYSICALLY UNIFORM MIXING OF Pt—Ru/Al$_2$O$_3$+Cs/Al$_2$O$_3$)

An impregnation solution was prepared by mixing 35.5 mL of an 8.5 mass percent dinitrodiamine platinum aqueous solution, 55.6 mL of a 3.6 mass percent ruthenium nitrate aqueous solution, and 14.7 g of cesium nitrate. 40 mL of this impregnation solution was used to impregnate 90 g of alumina substrate SBa for 0.5 hour. The saturated water absorption of SBa is 0.45 mL/g. After this, the substrate was dried for 20 hours at a temperature of 90° C.

Meanwhile, 100 g of alumina substrate was impregnated for 0.5 hour with 30 mL of a 50 mass percent cesium nitrate aqueous solution, after which the substrate was dried for 20 hours at a temperature of 90° C.

The two types of alumina substrate thus obtained were uniformly mixed in a mortar in amounts of 50 g each. The uniform mixture thus obtained was granulated and packed into a specific vessel, then subjected to a reduction treatment for one hour at a temperature of 500° C. and a space velocity of 2000 hour$^{-1}$, which yielded a physically uniform mixed catalyst of Pt—Ru/Al$_2$O$_3$+Cs /Al$_2$O$_3$.

The distance in this catalyst between the cesium (the supply material for active oxygen capable of oxidizing carbon monoxide) and the platinum and ruthenium (noble metals) was approximately 5 μm.

The catalyst thus obtained was subjected to the same test as in Example 1. As a result, the carbon monoxide concentration could be lowered to under 40 ppm over a temperature range of 100 to 140° C.

EXAMPLE 36 (Cs/Al$_2$O$_3$ (UPPER LAYER)+Pt—Ru/Al$_2$O$_3$ (LOWER LAYER))

The catalyst supporting platinum and ruthenium and the catalyst supporting cesium from Example 35 were granulated separately. The catalyst supporting cesium was packed into the upper layer of a reactor, while the catalyst supporting platinum and ruthenium was packed into the lower layer of the reactor. Each catalyst was subjected to a reduction treatment in this reactor over a period of one hour at a temperature of 500° C. and a space velocity of 2000 hours$^{-1}$ and in a hydrogen gas flow, which gave a Cs/Al$_2$O$_3$ (UPPER LAYER)+Pt—Ru/Al$_2$O$_3$ (LOWER LAYER) catalyst.

The distance between the catalyst supporting cesium (the supply material for active oxygen capable of oxidizing carbon monoxide) and the catalyst supporting platinum and ruthenium (noble metals) was adjusted to approximately 0.3 mm.

The catalyst thus obtained was subjected to the same test as in Example 1. As a result, the carbon monoxide concentration could be lowered to under 40 ppm over a temperature range of 100 to 120° C.

EXAMPLE 37 (Pt—Ru/Al$_2$O$_3$ (UPPER LAYER)+Cs/Al$_2$O$_3$ (LOWER LAYER))

Just as in Example 36, the catalyst supporting platinum and ruthenium and the catalyst supporting cesium were granulated separately. The alumina substrate impregnated with cesium was packed into the reactor lower layer, while the alumina substrate impregnated with platinum and ruthenium was packed into the reactor upper layer. Each catalyst was subjected to a reduction treatment in this reactor over a period of one hour at a temperature of 500° C. and a space velocity of 2000 hours$^{-1}$ and in a hydrogen gas flow, which gave a Pt—Ru/Al$_2$O$_3$ (upper layer)+Cs/Al$_2$O$_3$ (lower layer) catalyst.

The distance between the catalyst supporting cesium (the supply material for active oxygen capable of oxidizing carbon monoxide) and the catalyst supporting platinum and ruthenium (noble metals) was adjusted to approximately 0.3 mm.

The catalyst thus obtained was subjected to the same test as in Example 1. As a result, the carbon monoxide concentration could be lowered to under 40 ppm over a temperature range of 120 to 140° C.

EXAMPLE 38 (Cs/Al$_2$O$_3$+Pt—Ru/Al$_2$O$_3$)

Just as in Example 36, the catalyst supporting platinum and ruthenium and the catalyst supporting cesium were granulated separately. The two types of granular catalyst were uniformly packed into a reactor. The catalyst was subjected to a reduction treatment in this reactor over a period of one hour at a temperature of 500° C. and a space velocity of 2000 hours$^{-1}$ and in a hydrogen gas flow, which gave a Cs/Al$_2$O$_3$+Pt—Ru/Al$_2$O$_3$ catalyst.

The distance between the catalyst supporting cesium (the supply material for active oxygen capable of oxidizing carbon monoxide) and the catalyst supporting platinum and ruthenium (noble metals) was adjusted to approximately 0.1 mm.

The catalyst thus obtained was subjected to the same test as in Example 1. As a result, the carbon monoxide concentration could be lowered to under 40 ppm over a temperature range of 100 to 140° C.

EXAMPLE 39 (Pt—Ru/Al$_2$O$_3$+K/Al$_2$O$_3$)

In Example 38, the catalyst supporting cesium was changed to a catalyst supporting potassium. A 50 mass percent potassium solution was used to support the potassium on the substrate. The catalyst supporting platinum and ruthenium and the catalyst supporting potassium were granulated separately. The two types of granular catalyst were uniformly packed into a reactor. The catalyst was subjected to a reduction treatment in this reactor over a period of one hour at a temperature of 500° C. and a space velocity of 2000 hour$^{-1}$ and in a hydrogen gas flow, which gave a Pt—Ru/Al$_2$O$_3$+K/Al$_2$O$_3$ catalyst.

The distance between the catalyst supporting potassium (the supply material for active oxygen capable of oxidizing carbon monoxide) and the catalyst supporting platinum and ruthenium (noble metals) was adjusted to approximately 0.1 mm.

The catalyst thus obtained was subjected to the same test as in Example 1. As a result, the carbon monoxide concentration could be lowered to under 40 ppm over a temperature range of 100 to 140° C.

EXAMPLE 40 (Pt—Ru/Al$_2$O$_3$+Mg/Al$_2$O$_3$)

In Example 38, the catalyst supporting cesium was changed to a catalyst supporting magnesium. A 50 mass percent magnesium solution was used to support the potassium on the substrate. The catalyst supporting platinum and ruthenium and the catalyst supporting magnesium were granulated separately. The two types of granular catalyst were uniformly packed into a reactor. The catalyst was subjected to a reduction treatment in this reactor over a period of one hour at a temperature of 500° C. and a space velocity of 2000 hour$^{-1}$ and in a hydrogen gas flow, which gave a Pt—Ru/Al$_2$O$_3$+Mg/Al$_2$O$_3$ catalyst.

The distance between the catalyst supporting magnesium (the supply material for active oxygen capable of oxidizing carbon monoxide) and the catalyst supporting platinum and ruthenium (noble metals) was adjusted to approximately 0.1 mm.

The catalyst thus obtained was subjected to the same test as in Example 1. As a result, the carbon monoxide concentration could be lowered to under 40 ppm over a temperature range of 120 to 140° C.

EXAMPLE 41 (Pt—Ru/Al$_2$O$_3$+Ce/Al$_2$O$_3$)

In Example 38, the catalyst supporting cesium was changed to a catalyst supporting cerium. A 50 mass percent cerium solution was used to support the potassium on the substrate. The catalyst supporting platinum and ruthenium and the catalyst supporting cerium were granulated separately. The two types of granular catalyst were uniformly packed into a reactor. The catalyst was subjected to a reduction treatment in this reactor over a period of one hour at a temperature of 500° C. and a space velocity of 2000 hour$^{-1}$ and in a hydrogen gas flow, which gave a Pt—Ru/Al$_2$O$_3$+Ce/Al$_2$O$_3$ catalyst.

The distance between the catalyst supporting cerium (the supply material for active oxygen capable of oxidizing carbon monoxide) and the catalyst supporting platinum and ruthenium (noble metals) was adjusted to approximately 0.1 mm.

The catalyst thus obtained was subjected to the same test as in Example 1. As a result, the carbon monoxide concentration could be lowered to under 40 ppm over a temperature range of 100 to 140° C.

COMPARATIVE SAMPLE 13 (Pt—Ru/Al$_2$O$_3$ (UPPER LAYER)+Al$_2$O$_3$ (MIDDLE LAYER)+Cs/Al$_2$O$_3$ (LOWER LAYER))

Just as in Example 36, the catalyst supporting platinum and ruthenium and the catalyst supporting cesium were granulated separately, and just an alumina substrate was also granulated. The catalyst particles supporting cesium were packed into the lower layer of the reactor, the particles of the alumina substrate were packed into the reactor middle layer, and the catalyst particles supporting platinum and ruthenium were packed into the upper layer of the reactor. The catalysts were subjected to a reduction treatment in this reactor over a period of one hour at a temperature of 500° C. and a space velocity of 2000 hours$^{-1}$ and in a hydrogen gas flow, which gave a Pt—Ru/Al$_2$O$_3$ (upper layer)+Al$_2$O$_3$ (middle layer)+Cs /Al$_2$O$_3$ (lower layer) catalyst.

The distance between the catalyst supporting cesium (the supply material for active oxygen capable of oxidizing carbon monoxide) and the catalyst supporting platinum and ruthenium (noble metals) was adjusted to approximately 0.6 mm.

The catalyst thus obtained was subjected to the same test as in Example 1. As a result, the carbon monoxide concentration could not be lowered to under 40 ppm.

COMPARATIVE SAMPLE 14 (Pt—Ru/Al$_2$O$_3$)

A catalyst supporting platinum and ruthenium was obtained by the same method as in Example 35, and granulated.

The catalyst was packed into a reactor and subjected to a reduction treatment in this reactor over a period of one hour at a temperature of 500° C. and a space velocity of 2000 hour$^{-1}$ and in a hydrogen gas flow, which gave a Pt—Ru/Al$_2$O$_3$ catalyst.

The catalyst thus obtained was subjected to the same test as in Example 1. As a result, the carbon monoxide concentration could not be lowered to under 40 ppm.

The test results from Examples 35 to 41 and Comparative Samples 13 and 14 are compiled in Table 3.

The contents of Tokugan 2001-265409, with a filing date of Sep. 3, 2001 in Japan, and Tokugan 2002-232481 with a filing date of Aug. 9, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings. The embodiments of this invention in which an exclusive property or privilege is claimed are defined as follows:

TABLE 1

| EXAMPLE | COMPARATIVE SAMPLE | Ru:Pt | ADDITIVE | ADDITIVE AMOUNT (mass %) | SUBSTRATE | MODEL GAS | TEMPERATURE WINDOW | Δ T |
|---|---|---|---|---|---|---|---|---|
| 1 |  | 1:1.5 | Cs | 0.1–30 | Al$_2$O$_3$ | 1 | 60–140° C. | 5–80 |
| 2 |  | 1:0.25 | Cs | 2 | Al$_2$O$_3$ | 1 | 140–160° C. | 20 |
| 3 |  | 1:0.67 | Cs | 2 | Al$_2$O$_3$ | 1 | 120–160° C. | 40 |
| 4 |  | 1:1 | Cs | 2 | Al$_2$O$_3$ | 1 | 100–140° C. | 40 |
| 5 |  | 1:1.5 | Cs | 2 | Al$_2$O$_3$ | 1 | 80–130° C. | 50 |
| 6 |  | 1:4 | Cs | 2 | Al$_2$O$_3$ | 1 | 100–140° C. | 40 |
| 7 |  | 1:1.5 | K | 3 | Al$_2$O$_3$ | 1 | 120–140° C. | 20 |
| 8 |  | 1:1.5 | Ba | 3 | Al$_2$O$_3$ | 1 | 80–140° C. | 40 |
| 9 |  | 1:1.5 | Ca | 3 | Al$_2$O$_3$ | 1 | 100–140° C. | 40 |
| 10 |  | 1:1.5 | La | 3 | Al$_2$O$_3$ | 1 | 80–120° C. | 40 |
| 11 |  | 1:1.5 | Ce | 3 | Al$_2$O$_3$ | 1 | 80–120° C. | 40 |
| 12 |  | 1:1.5 | Nd | 3 | Al$_2$O$_3$ | 1 | 100–120° C. | 20 |
| 13 |  | 1:1.5 | Pr | 3 | Al$_2$O$_3$ | 1 | 100–140° C. | 40 |
| 14 |  | 1:1 | Cs | 3 | SiO$_2$ | 1 | 100–140° C. | 40 |
| 15 |  | 1:1 | Cs | 3 | TiO$_2$ | 1 | 100–140° C. | 40 |
| 16 |  | 1:1 | Cs | 3 | ZrO$_2$ | 1 | 120–160° C. | 40 |
| 17 |  | 1:1 | Cs | 3 | SiO$_2$—Al$_2$O$_3$ | 1 | 140–160° C. | 20 |
| 18 |  | 1:1.5 | Cs | 1 | Al$_2$O$_3$ | 2 | 80–120° C. | 40 |
| 19 |  | 1:1.5 | Cs | 1 | Al$_2$O$_3$ | 2 | 100–140° C. | 40 |
| 20 |  | 1:1.5 | Pr | 1 | Al$_2$O$_3$ | 2 | 100–140° C. | 40 |
| 21 |  | 1:1 | Ca | 1 | Al$_2$O$_3$ | 3 | 100–140° C. | 40 |
| 22 |  | 1:1 | Cs | 1 | Al$_2$O$_3$ | 3 | 100–140° C. | 40 |
| 23 |  | 1:1 | Pr | 1 | Al$_2$O$_3$ | 3 | 120–140° C. | 20 |
|  | 1 | 1:0 | Cs | 2 | Al$_2$O$_3$ | 1 | 180° C. | 0 |
|  | 2 | 1:0.1 | Cs | 2 | Al$_2$O$_3$ | 1 | 160° C. | 0 |
|  | 3 | 1:5.6 | Cs | 2 | Al$_2$O$_3$ | 1 | 130° C. | 0 |
|  | 4 | 1:9 | Cs | 2 | Al$_2$O$_3$ | 1 | 130° C. | 0 |
|  | 5 | 0:1 | Cs | 2 | Al$_2$O$_3$ | 1 | 140° C. | 0 |
|  | 6 | 1:1 | — | — | Al$_2$O$_3$ | 1 | 120° C. | 0 |

TABLE 1-continued

| EXAMPLE | COMPARATIVE SAMPLE | Ru:Pt | ADDITIVE | ADDITIVE AMOUNT (mass %) | SUBSTRATE | MODEL GAS | TEMPERATURE WINDOW | Δ T |
|---|---|---|---|---|---|---|---|---|
| | 7 | 1:1 | — | — | $SiO_2$ | 1 | 120° C. | 0 |
| | 8 | 1:0.1 | Cs | 0.05 | $Al_2O_3$ | 1 | 180° C. | 0 |
| | 9 | 1:9 | Cs | 25 | $Al_2O_3$ | 1 | 140° C. | 0 |

TABLE 2

| EXAMPLE | COMPARATIVE SAMPLE | AMOUNT OF SOLUTION | IMPREGNATION WITH Cs | DRYING TEMP. (° C.) | REDUCTIVE GAS | SV (hour$^{-1}$) | Cs MATERIAL | TEMP. WINDOW | Δ T | DST (nanometer) |
|---|---|---|---|---|---|---|---|---|---|---|
| 24 | | ≦SWA | SIM. | 90 | $H_2$ | 2000 | Cs—NT | 60–130° C. | 70 | 3 |
| | 10 | ≧SWA | " | 90 | $H_2$ | 2000 | " | — | 0 | 8 |
| 25 | | ≦SWA | EARLIER | 90 | $H_2$ | 2000 | " | 80–140° C. | 60 | 6 |
| 26 | | " | LATER | 90 | $H_2$ | 2000 | " | 100–140° C. | 40 | 6 |
| 27 | | " | SIM. | 150 | $H_2$ | 2000 | " | 80–140° C. | 60 | 5 |
| 28 | | " | " | 30 | $H_2$ | 2000 | " | 120–140° C. | 20 | 5 |
| | 11 | " | " | 90 | AIR | 2000 | " | — | 0 | 10 |
| | 12 | " | " | 90 | $N_2$ | 2000 | " | 160° C. | 0 | 8 |
| 29 | | " | " | 90 | $H_2$ | 1000 | " | 120–140° C. | 20 | 5 |
| 30 | | " | " | 90 | $H_2$ | 5000 | " | 60–130° C. | 70 | 3 |
| 31 | | " | " | 90 | $H_2$ | 2000 | Cs—CT | 100–140° C. | 40 | 4 |
| 32 | | " | " | 90 | $H_2$ | 2000 | Cs—AT | 80–140° C. | 60 | 3 |
| 33 | | " | " | 90 | $H_2$ | 2000 | K—AT | 100–140° C. | 40 | 4 |
| 34 | | " | " | 90 | $H_2$ | 2000 | Mg—AT | 100–140° C. | 40 | 4 |

NOTE:
SWA = SATURATED WATER ABSORPTION
SV = SPACE VELOCITY DURING REDUCTION
SIM. = SIMULTANEOUS WITH IMPREGNATION WITH NOBLE METAL
DST = DISTANCE BETWEEN NOBLE METAL AND ACTIVE OXYGEN SUPPLY MATERIAL
EARLIER = EARLIER THAN IMPREGNATION WITH NOBLE METAL
LATER = LATER THAN IMPREGNATION WITH NOBLE METAL
Cs—NT = CESIUM NITRATE
Cs—CT = CESIUM CARBONATE
K—AT = POTASSIUM ACETATE

TABLE 3

| EXAMPLE | COMPARATIVE SAMPLE | AMOUNT OF SOLUTION | IMPREGNATION WITH Cs | DRYING TEMP. (° C.) | REDUCTIVE GAS | SV (hour$^{-1}$) | Cs MATERIAL | TEMP. WINDOW | Δ T | DST (nanometer) |
|---|---|---|---|---|---|---|---|---|---|---|
| 35 | | ≦SWA | SEP | 90 | $H_2$ | 2000 | Cs—NT | 100–140° C. | 40 | 5 |
| 36 | | " | SEP | 90 | $H_2$ | 2000 | " | 100–120° C. | 20 | 300 |
| 37 | | " | SEP | 90 | $H_2$ | 2000 | " | 120–140° C. | 20 | 300 |
| 38 | | " | SEP | 90 | $H_2$ | 2000 | " | 100–140° C. | 40 | 100 |
| 39 | | " | SEP | 90 | $H_2$ | 2000 | K—AT | 100–140° C. | 40 | 100 |
| 40 | | " | SEP | 90 | $H_2$ | 2000 | Mg—AT | 120–140° C. | 20 | 100 |
| 41 | | " | SEP | 90 | $H_2$ | 2000 | Ce—NT | 100–140° C. | 40 | 100 |
| | 13 | " | SEP | 90 | $H_2$ | 2000 | Cs—NT | — | 0 | 600 |
| | 14 | " | — | 90 | $H_2$ | 2000 | — | — | 0 | — |

NOTE:
SWA = SATURATED WATER ABSORPTION
SV = SPACE VELOCITY DURING REDUCTION
SEP = IMPREGNATION PERFORMED SEPARATELY
DST = DISTANCE BETWEEN NOBLE METAL AND ACTIVE OXYGEN SUPPLY MATERIAL
Cs—NT = CESIUM NITRATE
K—AT = POTASSIUM ACETATE
Ce—NT = CERIUM NITRATE

What is claimed is:

1. A catalyst for selectively oxidizing carbon monoxide, comprising:
   a substrate;
   a noble metal comprising ruthenium and platinum supported on the substrate, the mass ratio between ruthenium and platinum being from 1:0.2 to 1:5; and
   a supply material supported on the substrate for supplying active oxygen to the noble metal, the distance between the supply material and the noble metal being set to no more than 0.1 millimeter to cause the active oxygen to be transferred from the supply material to the noble metal.

2. The catalyst for selectively oxidizing carbon monoxide as defined in claim 1, wherein the supply material comprises one of an alkali metal compound, an alkaline earth metal compound, and a rare earth metal compound, and the amount in which the supply material is supported is, in terms of metal amount, from 0.1 to 20 mass percent with respect to an amount of the substrate.

3. The catalyst for selectively oxidizing carbon monoxide as defined in claim 1, wherein the substrate comprises one of alumina, titania, silica, and zirconia.

4. The catalyst for selectively oxidizing carbon monoxide as defined in claim 2, wherein the alkali metal compound comprises one of potassium, cesium, rubidium, sodium, and lithium.

5. The catalyst for selectively oxidizing carbon monoxide as defined in claim 2, wherein the alkaline earth metal compound comprises one of barium, calcium, magnesium, and strontium.

6. The catalyst for selectively oxidizing carbon monoxide as defined in claim 2, wherein the rare earth metal compound comprises one of lanthanum, cerium, praseodymium, neodymium, samarium, and gadolinium.

7. A method for reducing the carbon monoxide concentration of a reformate gas using the catalyst for selectively oxidizing carbon monoxide as defined in claim 1, wherein the carbon monoxide contained in a reformate gas is selectively oxidized into carbon dioxide by bringing a mixed gas of the reformate gas and oxygen into contact with the catalyst for selectively oxidizing carbon monoxide.

8. The carbon monoxide concentration reduction method as defined in claim 7, wherein the mixed gas is brought into contact with the catalyst for selectively oxidizing carbon monoxide at a temperature between 60° C. and 200° C.

9. The carbon monoxide concentration reduction method as defined in claim 7, wherein the reformate gas contains, in terms of volumetric ratio, no more than 10 percent unreformed fuel.

10. A method for manufacturing the catalyst for selectively oxidizing carbon monoxide as defined in claim 1, comprising:

(a) forming an impregnated substrate, in which a substrate is impregnated with a precursor of an active oxygen supply material and a precursor of a noble metal at a water content that is no more than the saturated water absorption of the substrate;

(b) drying the impregnated substrate; and (c) subjecting the dried impregnated substrate to a reduction treatment in a reductive gas.

11. The method for manufacturing a catalyst for selectively oxidizing carbon monoxide as defined in claim 10, wherein the impregnated substrate is dried at a temperature between 40° C. and 100° C.

12. The method for manufacturing a catalyst for selectively oxidizing carbon monoxide as defined in claim 10, wherein the reductive gas is hydrogen gas.

13. The method for manufacturing a catalyst for selectively oxidizing carbon monoxide as defined in claim 10, wherein the space velocity of the reductive gas is at least 1000 hour$^{-1}$.

14. The method for manufacturing a catalyst for selectively oxidizing carbon monoxide as defined in claim 10, wherein the active oxygen supply material comprises one of an alkali metal compound, an alkaline earth metal compound, and a rare earth metal compound.

15. The method for manufacturing a catalyst for selectively oxidizing carbon monoxide as defined in claim 10, wherein the active oxygen supply material comprises a cesium-containing compound.

16. The method for manufacturing a catalyst for selectively oxidizing carbon monoxide as defined in claim 15, wherein the precursor of the active oxygen supply material comprises cesium nitrate.

17. The method for manufacturing a catalyst for selectively oxidizing carbon monoxide as defined in claim 10, wherein the substrate comprises an alumina substrate.

* * * * *